Patented Feb. 5, 1929.

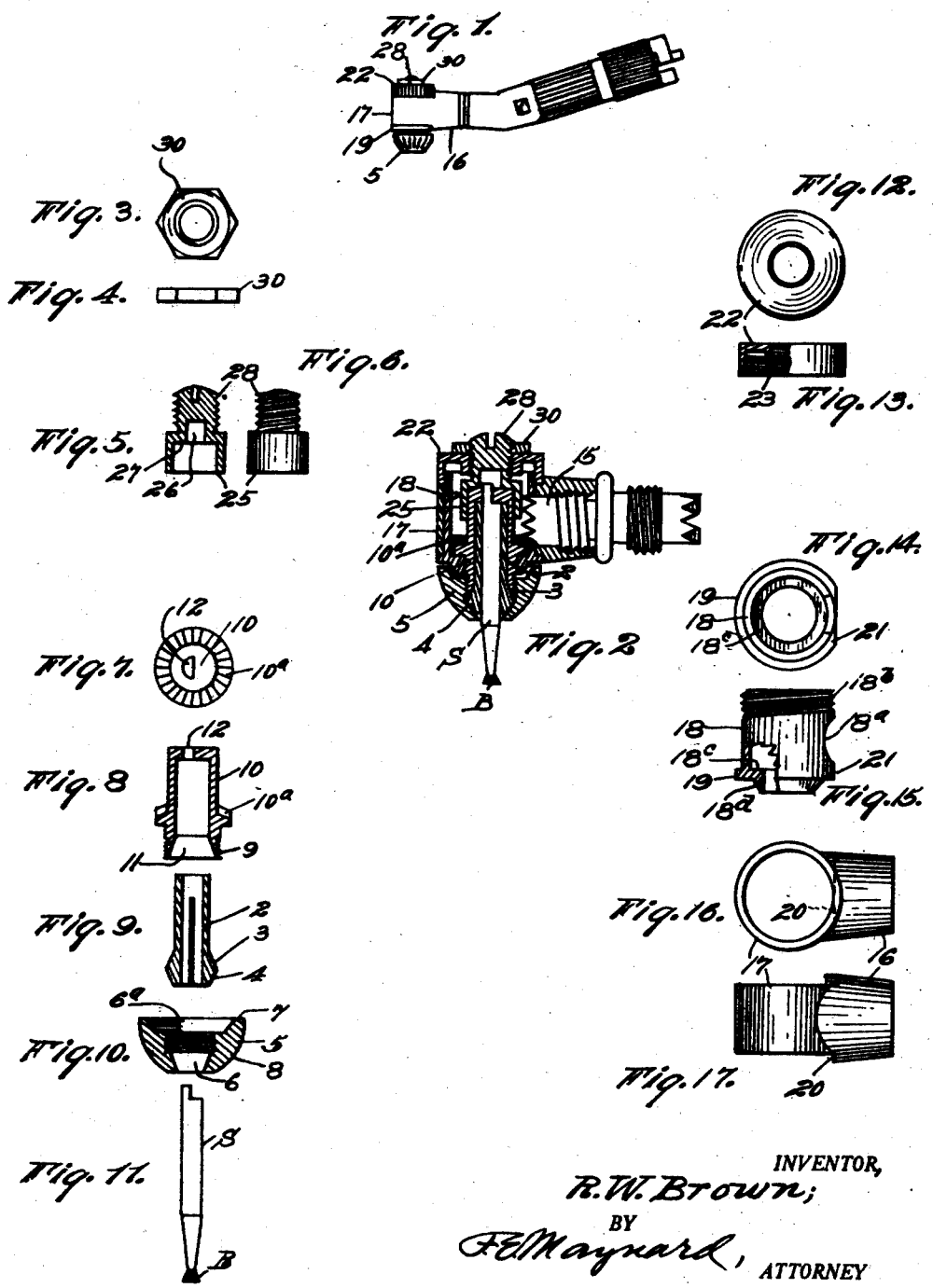

1,701,172

UNITED STATES PATENT OFFICE.

RAY W. BROWN, OF LOS ANGELES, CALIFORNIA, ASSIGNOR TO THE MECHANICAL APPLIANCES COMPANY, A CORPORATION OF CALIFORNIA.

DENTAL TOOL.

Application filed August 22, 1927. Serial No. 214,655.

My present invention is an improvement in the type of dental tools shown in United States Patents Numbers 1,548,180 and 1,621,190, and differs from these in several important respects as will be clearly established below.

Patent Number 1,548,180 shows a clutch collet extending through the tool shell from end to end and is set by a draw-in nut 18. Open running joints occur at each end of the shell.

Patent Number 1,621,190 shows a closed top end shell and an open, lower end running joint with a removable foot nut 22 holding in the rotary parts.

My present invention is characterized by improved features seeking to provide a practically leak-proof tool case or shell; to provide for centrifugally discharging saliva, water, pumice and other foreign matter from the tool shell so as to keep this in a clean and sanitary condition.

An object is to reduce friction to a minimum and provide a single adjustable bearing to take both end and side thrust and by which the running clearance can be very closely determined and maintained.

Another object is to provide a collet setting nut constructed and arranged to centrifugally eject foreign matter seeking entry into the tool chamber and which nut is so combined with the parts as to effect the setting of the collet without itself causing frictional resistance to rotation.

Other objects, advantages and features of construction, combination and details of the disclosed embodiment will be made manifest in the ensuing specification pertinent to the accompanying drawings; it being understood that modifications, variations and adaptations may be resorted to within the spirit, scope and principle of the invention as it is more directly hereinafter claimed.

Fig. 1 is a side elevation of a full size tool. Fig. 2 is an axial section, on an enlarged scale. Fig. 3 is a plan of the top bearing lock nut and Fig. 4 is a side view thereof. Fig. 5 is an axial section of the adjustable top bearing and Fig. 6 is a side elevation thereof. Fig. 7 is a plan of the collet box and its driving gear, body flange and Fig. 8 is an axial section thereof.

Fig. 9 is an axial section of the collet. Fig. 10 is an axial section of the centrifugal ejector and collet closing nut. Figure 11 is an elevation of one type of dental implement for operation by the present tool. Fig. 12 is a plan of the top cap of the housing and Fig. 13 is a broken-out side elevation thereof. Fig. 14 is a plan of the gear barrel and bottom bearing and Fig. 15 is a side elevation thereof. Fig. 16 is a plan of the tool housing (or outer shell) and Fig. 17 is a side view thereof.

The present hand piece includes a multi-slit collet 2 having reverse frusto-conoids 3 and 4; the collet bore being adapted to receive a complementary stem S of a desired burr B, or other implement. To close the collet 2 on a stem S an annular collar or nut 5 is provided and has a conical seat 6 matching the conoid 4 of the collet.

This collet nut is a feature of the invention and has its upper end flared outward into an annular lip or top ridge 7. When the nut is in place and is rotating the lip 7 and the flared outer body surface 8 operate to centrifugally throw off liquid and foreign matter which might otherwise tend to seep into the tool canals. The collet nut has a threaded, central bore $6^a$ to receive the threaded lower end 9 of a cylindrical box or sleeve 10 bored to fit the insertable collet 2 and having a female seat 11 for the conoid 3 of the collet. The upper end of the box 10 is closed except for a D-hole 12 for the D-head of the stem S.

The box 10 has an external, upwardly facing bevel gear $10^a$ to be positively driven by a cooperative pinion device 15 journalled in the lateral hub 16 of a ring or housing 17 which is bored to snugly fit an inner barrel 18 which has, on its lower end, an external bead 19 butting up to the lower end of the housing 17. This latter has a flat, cross-shoulder 20 opposed to the flattened side 21 of the bead 19 so that the barrel and the housing interlock against relative rotation when assembled.

The side of the barrel opposed to the hub 16 has an aperture $18^a$ for the drive pinion 15 and the upper end of the barrel is externally threaded at $18^b$ to receive a closing cap 22. This cap has a central, threaded, bottom boss 23.

The lower face of the gear $10^a$ forms a shoulder which lies just above a bottom bearing ledge $18^c$ in the barrel and in order to closely determine the minimum free running position of the driven box 10 and its gear 10ª I provide an adjustable, top bearing member in the form of an inverted cup 25 operatively fitting the head of the box 10 and being countersunk at 26 to clear the stem S. The cup has an internal annular shoulder 27 to take the end thrust of the working box 10. The upper end of the cup 25 is provided with a threaded body 28 and this is adjustable in the threaded boss 23 of the cap 22 after this is set in place on the threads 18$^b$ of the barrel 18.

When the gear-box part 10 is dropped into place on the seat 18$^c$ the cap 22 with the bearing cup 25, is applied to the housing and barrel and the bearing 25 is set to allow the box 10 to turn free with minimum end play. It will be observed that only one bearing part for the rotary box is or can be adjusted: the shoulder 18$^c$ is fixed. Therefore, the gear 10ª cannot be unduly crowded up against the driving pinion 15 and the drilling pressure reaction is taken by the bearing cup 25.

After bearing adjustment has been accurately made the bearing 25 is locked by a lock-nut 30 on the body 28 and which seats down on the cap 22.

The only exposed running joint is at the bottom of the shoulder 18$^c$ and this has a deep, guard rim 18$^d$ entering the flared lip 7 of the collet nut 5. Therefore, during rotation of the collet nut capillary action is negatived and centrifugal force acts to cast off foreign matter at the base of the tool.

The gear enclosing barrel 18 may be filled with a non-flowing lubricant which, by reason of the snug co-fit and coaction of the several elements of the tool, will be retained in good condition and volume for a long period of use.

What is claimed is:

1. A dental tool including a housing, rotary implement driving and holding means in said housing, the housing being closed at the top; and rotating means flanged over the bottom of the housing to centrifugally cast off foreign matter from the running joint at the bottom of the housing.

2. A dental tool including a housing open at the bottom, means closing the top of the housing against fluid entrance, rotary implement carrying means accessible at the bottom of the housing and including a collet, and a flared collet closing nut attachable to said rotary means and operative to centrifugally eject foreign matter at the lower part of the housing.

3. A dental tool including a housing closed at the top and open at the bottom for implement mounting, a collet box extending from the bottom of the housing, a fixed guard rim journalling the lower end of the box, and a collet nut adjustable on said box and having an outwardly flared lip surrounding the rim; whereby centrifugal action ejects loose matter and capillary attraction into the housing is negatived.

4. A dental tool having a rotary collet box, a shell member enclosing the box and through the bottom of which the box extends, a collet mounted in the box, and a running collet nut threaded on the said box; said shell member having a guard rim on its bottom and said collet nut having an outwardly flared ejector lip around the guard rim to centrifugally cast off foreign matter during rotation.

5. A dental tool having a rotary collet box, a box barrel having a bottom bearing shoulder projecting inwardly to support the box and forming a lateral bearing for the lower end of the box and below which the box has a threaded end, a collet in the box, a collet nut mounted on the box and running therewith, a cap member closing the upper end of the barrel, and an end thrust regulating bearing, for the box, adjustable in said cap and covering the upper end of the box and whereby end play of the box is controlled.

6. A dental tool having a rotary collet box, a barrel in which the box is mounted, a collet in the box, a collet closing nut mounted on the box, a stationary cap member closing the upper end of the barrel and having an adjustable bearing for one end of the box to control its end play and covering its end, and means for locking the adjusted bearing on the cap.

7. A dental tool having a ring-like housing provided with a lateral hub for a drive gear, a barrel fitted in said housing and having a rest therefor, a cap attachable to the barrel to secure the housing in place, a bearing adjustable in the cap, a running collet box whose ends are journalled in the cap and in said barrel, a tool collet in the box, and a collet closing nut screwed on the collet box and exposed at the bottom of the barrel; the bearing covering the end of the box.

RAY W. BROWN.